US009570760B2

(12) United States Patent
Shirvanian

(10) Patent No.: US 9,570,760 B2
(45) Date of Patent: Feb. 14, 2017

(54) FUEL CELL ELECTRODE ASSEMBLY AND METHOD OF MAKING THE SAME

(75) Inventor: Alireza Pezhman Shirvanian, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 817 days.

(21) Appl. No.: 12/770,277

(22) Filed: Apr. 29, 2010

(65) Prior Publication Data
US 2011/0165496 A1 Jul. 7, 2011

(51) Int. Cl.
*H01M 4/88* (2006.01)
*H01M 4/86* (2006.01)
*H01M 4/92* (2006.01)

(52) U.S. Cl.
CPC ......... *H01M 4/8835* (2013.01); *H01M 4/8642* (2013.01); *H01M 4/8657* (2013.01); *H01M 4/881* (2013.01); *H01M 4/921* (2013.01); Y02E 60/50 (2013.01)

(58) Field of Classification Search
USPC ................ 429/483, 485, 523, 524, 492, 532
See application file for complete search history.

(56) References Cited

U.S. PATENT DOCUMENTS

| | | | |
|---|---|---|---|
| 4,364,813 A | 12/1982 | White | |
| 4,490,219 A | 12/1984 | Bindra et al. | |
| 4,513,066 A | 4/1985 | Simon | |
| 5,856,036 A | 1/1999 | Smotkin et al. | |
| 5,879,827 A | 3/1999 | Debe et al. | |
| 5,879,828 A | 3/1999 | Debe et al. | |
| 6,391,487 B1 | 5/2002 | Totsuka | |
| 6,733,638 B2 | 5/2004 | Andrews et al. | |
| 6,783,569 B2 | 8/2004 | Cheon et al. | |
| 6,864,010 B1 | 3/2005 | McLean | |
| 6,958,308 B2 * | 10/2005 | Brown | 502/180 |

(Continued)

FOREIGN PATENT DOCUMENTS

| | | |
|---|---|---|
| EP | 1492621 B1 | 1/2007 |
| EP | 1 857 205 A1 | 11/2007 |

(Continued)

OTHER PUBLICATIONS

Research News Berkeley Lab, A Boost for Hydrogen Fuel Cell Research, Jan. 25, 2007, pp. 1-4.

(Continued)

*Primary Examiner* — Ula C Ruddock
*Assistant Examiner* — Thomas Parsons
(74) *Attorney, Agent, or Firm* — Damian Porcari; Brooks Kushman P.C.

(57) ABSTRACT

According to at least one aspect of the present invention, a fuel cell electrode assembly is provided. In one embodiment, the fuel cell electrode assembly includes a substrate and a plurality of catalyst regions supported on the substrate to provide a passage way formed between the catalyst regions for passing fuel cell reactants, at least a portion of the plurality of catalyst regions including a number of atomic layers of catalyst metals. In certain instances, the number of atomic layers of catalyst metals is greater than zero and less than 300. In certain other instances, the number of atomic layers of catalyst metals is between 1 and 100. In yet certain other instances, the number of atomic layers of catalyst metals is between 1 and 20.

15 Claims, 7 Drawing Sheets

(56) References Cited

U.S. PATENT DOCUMENTS

| | | |
|---|---|---|
| 7,141,328 B2 | 11/2006 | Fukumoto et al. |
| 7,179,561 B2 | 2/2007 | Niu et al. |
| 7,303,834 B2 | 12/2007 | Dearnaley et al. |
| 7,339,184 B2 | 3/2008 | Romano et al. |
| 7,351,444 B2 | 4/2008 | Wang et al. |
| 7,498,097 B2 | 3/2009 | Ueda et al. |
| 2004/0167014 A1 | 8/2004 | Yan et al. |
| 2005/0112048 A1 | 5/2005 | Tsakalakos et al. |
| 2005/0142433 A1 | 6/2005 | Ueda et al. |
| 2005/0208354 A1 | 9/2005 | Hahn et al. |
| 2006/0172885 A1 | 8/2006 | Shimazu et al. |
| 2006/0257717 A1 | 11/2006 | Huang |
| 2007/0059452 A1 | 3/2007 | Debe et al. |
| 2007/0059573 A1 | 3/2007 | Debe et al. |
| 2007/0082256 A1 | 4/2007 | Debe et al. |
| 2007/0212538 A1 | 9/2007 | Niu |
| 2007/0248875 A1 | 10/2007 | O'Brien et al. |
| 2007/0254141 A1 | 11/2007 | Morse et al. |
| 2008/0020261 A1 | 1/2008 | Hendricks et al. |
| 2008/0020923 A1 | 1/2008 | Debe et al. |
| 2010/0092841 A1* | 4/2010 | Lopez et al. .................. 429/44 |

FOREIGN PATENT DOCUMENTS

| | | |
|---|---|---|
| WO | 9624958 | 8/1996 |
| WO | 2007032991 | 3/2007 |
| WO | 2007047088 | 4/2007 |
| WO | 2009062096 A1 | 5/2009 |

OTHER PUBLICATIONS

N. Travitsky et al., Science Direct, Abstract: Pt-, PtNi- and PtCo-supported Catalysts for oxygen reduction in PEM fuel cells, Journal of Power Sources, vol. 161, Issue 2, Oct. 27, 2006, pp. 782-789.
R. Hector et al., Science Direct, Abstract: Durability study of Pt3Ni1 Catalysts as Cathode in PEM fuel cells, Electrochemistry Communications, vol. 6, Issue 8, Aug. 2004, pp. 795-799.
Yuguang Ma et al., Science Direct, Abstract: Pt surface segregation in bimetallic Pt3M alloys: A density funcitonal theory study, Surface Science, vol. 602, Issue 1, Jan. 1, 2008, pp. 107-113.
Hai-Yan Su et al., Modulating the reactivity of Ni-containing Pt(111)-skin catalysts by density functional theory calculations, The Journal of Chemical Physics, J. Chem. Phys 128, May 19, 2008.
Fuel Cells Durability—Stationary ½ Automotive ½ Portable, Omni Shoreham Hotel, Washington, D.C., View Conference Brochure, View Exhibit Information (PDF), Jul. 10, 2008.
Instability of Pt/C Electrocatalysts in Proton Exchange Membrane Fuel Cells, A. Mechanistic Investigation, P.J. Ferreika, G.Idj IaO, Y. Shao-Horn, D. Morgan, R. Makharia, S. Kocha, and H.A. Gasteiger, Oct. 7, 2005.
Platinum in Fuel Cells Gets a Helping Hand, News of the Week, by Pezchman, Jan. 12, 2007, vol. 315 www.sciencemag.org.
The Journal of Physical Chemistry, Surface Composition Effects in Electrocatalysis: Kinetics Oxygen Reduction on Well-Defined PtNi and PtCo Alloy Surfaces, Oct. 26, 2002.
Oxygen reduction on high surface area Pt-based alloy catalysts in comparison to well defined smooth bulk alloy electrodes, U.A. Paulus, A. Wokaun, G.G. Scherer, T. J. Schmidt, V. Stamenkovic, N.M. Markovic, P.N. Ross, Apr. 17, 2002.
Surface segregation effects in electrocatalysis; kinetics of oxygen reduction reaction on poloycrystalline Pt3Ni alloy surfaces, V. Stamenkovic, T.J. Schmidt, P.N. Ross, N.M. Markovic, Mar. 2, 2003.
Improved Oxygen Reduction Activity on PtcNi(111) via Increased Surface Site Availability, Vojislav R. Stamenkovic, Ben Fowler, Bongjin Simon Mun, Guofeng Wang, Philip N. Ross, Christopher A. Lucas, Nenad M. Markovic, by Pezchman, vol. 315 Jan. 26, 2007 www.sciencemag.org.
The Journal of Physical Chemistry B,, by Pezchman, Mar. 3, 2009, Platinum Monolayer on Nonnoble Metal-Noble Metal Core-Shell Nanoparticle Electrocatalysis for O Reduction, J. Zhang et al.
SpringerLink, Modern Aspects of Electrochemistry, Journal Article, Vayenas, Constantinos, pp. 1-2, received Sep. 20, 1995, Revised May 1, 1996.
MRS Materials Research Society Platinum Nanostructure Growth Using Self-Assembled Fluorocarbon Structure, Sang Hwui Lee et al., Spring 2007.
Shankar, K., et al., Fabrication of Nanowires of Multicomponent Oxides: Review of Recent Advances Materials Science & Eng. C, 25, 2005, pp. 738-751.
Comini, Elisabetta, et al., Metal Oxide Nanowires: Preparation & Application in Gas Sensing, Journal of Molecular Catalysis A: Chemical, 305, 2009, pp. 170-177.
Sun, Shibin, et al., Synthesis of Bundled Tungsten Oxide Nanowires With Controllable Morphology, Materials Characterization 60, 2009, pp. 437-440.
Lim, Jae Hoon, et al., Formation of Niobium Oxide Nanowires by Thermal Oxidation, Journal of Industrial & Eng. Chemistry, 15, 2009, pp. 860-864.
Debe, M., et al., High Voltage Stability of Nano-structured Thin Film Catalysts for PEM Fuel Cells, J. Power Sources, 161, 2006, pp. 1002-1011.
Gancs, L. et al., Crystallographic Characteristics of Nano-structured Thin Film fuel Cell Electrocatalysts, a HRTEM Study, Chem. Master 20, 2008, pp. 2444-2454.

\* cited by examiner

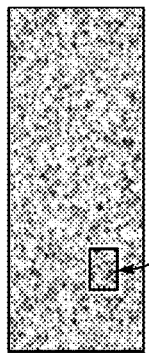
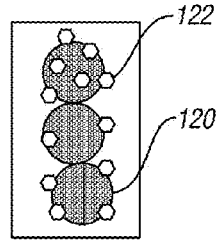
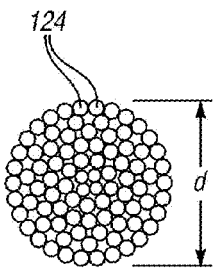
Fig. 1B1   Fig. 1B2   Fig. 1B3
(PRIOR ART)
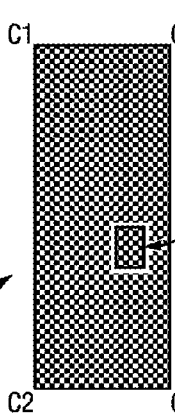
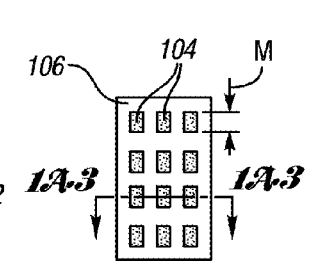
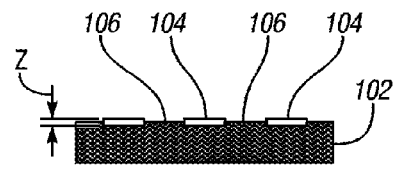
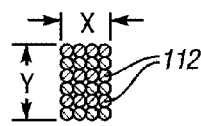
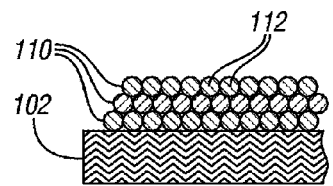
Fig. 1A1   Fig. 1A2   Fig. 1A3   Fig. 1A5   Fig. 1A4
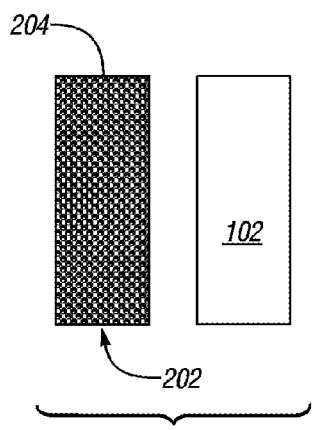
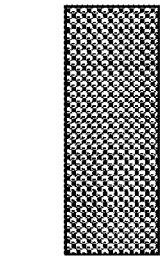
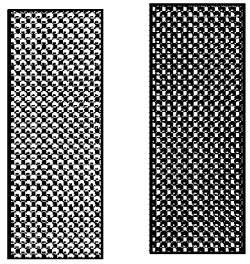
Fig. 2A   Fig. 2B   Fig. 2C

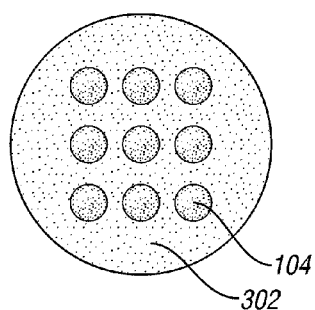 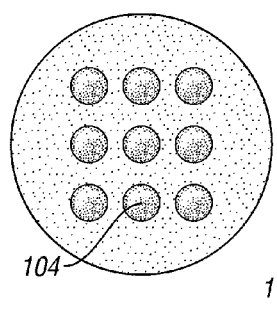 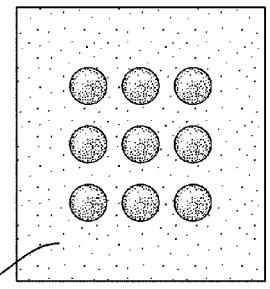
*Fig. 3A*   *Fig. 3B*   *Fig. 3C*
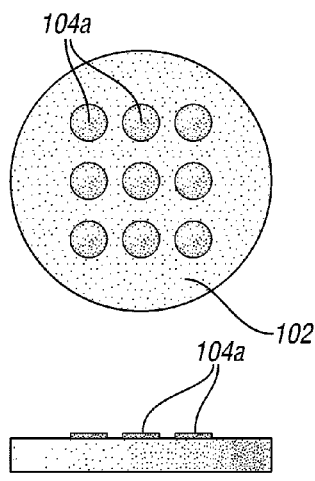 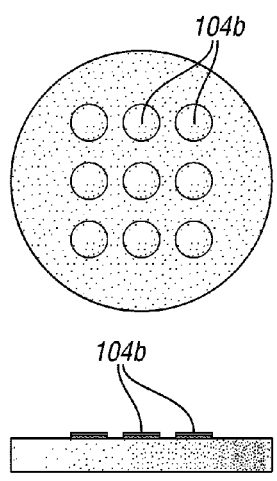 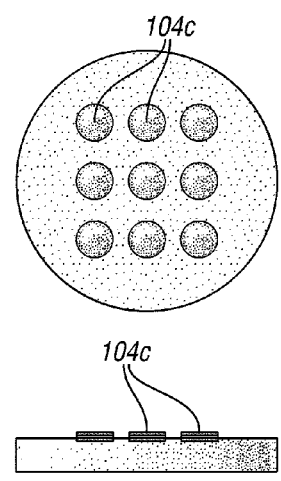
*Fig. 4A*   *Fig. 4B*   *Fig. 4C*

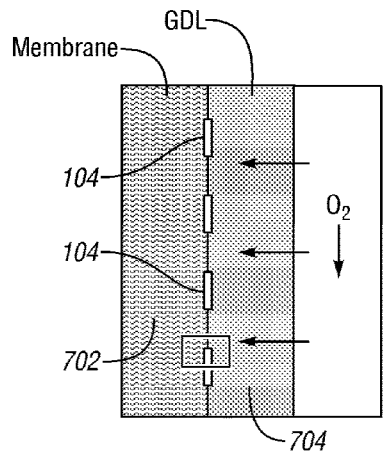
Fig. 7A
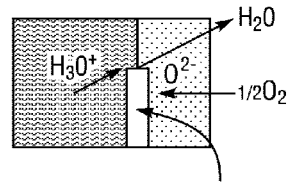
Fig. 7B
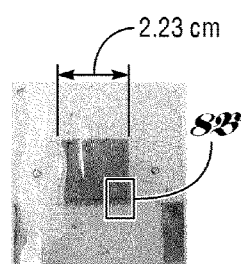
Fig. 8A
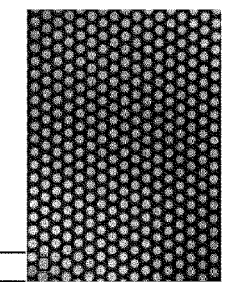
Fig. 8B
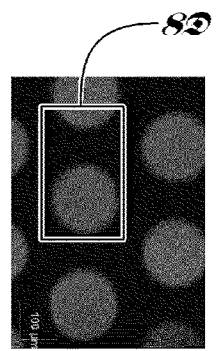
Fig. 8C
Fig. 8D
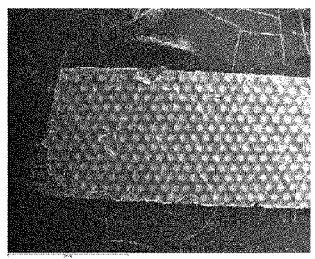
Fig. 9A
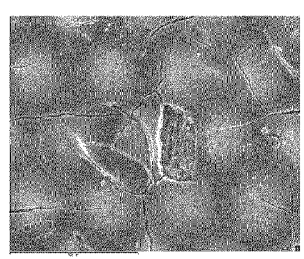
Fig. 9B
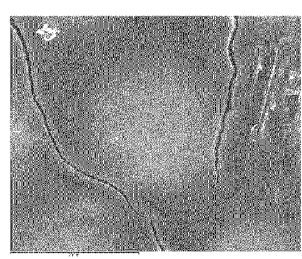
Fig. 9C 20 µm 5 µm 2 µm 1 µm 500 nm ized as the core-shell nano-particles, show some improvement over pure platinum nano-particles and/or pure platinum alloys nano-particles supported on carbon. However, these conventional core-shell catalysts, by virtue of being nano-particles, are still prone to agglomeration, dissolution and other durability issues.

FUEL CELL ELECTRODE ASSEMBLY AND METHOD OF MAKING THE SAME

BACKGROUND

1. Technical Field

One or more embodiments of this invention relate to a fuel cell electrode assembly having a plurality of catalyst regions and a method of making the same.

2. Background Art

While reliability and working lifetime have been considered for utilizing fuel cell (FC) technologies in automotive applications, catalyst activity remains one factor that needs thorough consideration for commercializing fuel cell technologies and in particular fuel cell vehicles. Efforts have been made with a focus on developing fuel cell catalysts having desirable electro-catalytic oxygen reduction reaction (ORR). To this end, fuel cell catalysts configured as what is known as the core-shell nano-particles, show some improvement over pure platinum nano-particles and/or pure platinum alloys nano-particles supported on carbon. However, these conventional core-shell catalysts, by virtue of being nano-particles, are still prone to agglomeration, dissolution and other durability issues.

SUMMARY

According to at least one aspect of the present invention, a fuel cell electrode assembly is provided. In one embodiment, the fuel cell electrode assembly includes a substrate and a plurality of catalyst regions supported on the substrate to provide a passage way between the catalyst regions for passing fuel cell reactants, at least a portion of the plurality of catalyst regions including a number of atomic layers of catalyst metals. In certain instances, the catalyst regions each include a number of atomic layers of catalyst metals. In certain other instances, the number of atomic layers of catalyst metals is greater than zero and less than 300. In certain other instances, the number of atomic layers of catalyst metals is between 1 and 100. In yet certain other instances, the number of atomic layers of catalyst metals is between 1 and 20.

In yet another embodiment, the passage way is configured to contain an additive selected from the group consisting of ionomer, porous carbon, and combinations thereof, wherein the additive is a proton, electron, and/or reactant conducting additive.

In another embodiment, the atomic layers of catalyst metals are configured to extend in a direction substantially perpendicular to a planar surface of the substrate.

In yet another embodiment, the catalyst regions are provided with less than 5 weight percent of carbon materials.

In yet another embodiment, the substrate is a polymer electrolyte membrane (PEM). In yet another embodiment, the substrate is a gas diffusion layer (GDL).

In yet another embodiment, the plurality of catalyst regions are provided with an average aspect ratio greater than 100, the average aspect ratio being an average ratio of the largest linear distance between any two points on the perimeter of each of the catalyst regions relative to a thickness of the catalyst region.

In yet another embodiment, the catalyst metals are selected from the group consisting of platinum nickel alloys $Pt_3Ni$, platinum cobalt alloys PtCo, platinum copper alloys $Pt_3Cu$, and combinations thereof.

In yet another embodiment, the fuel cell reactants include water molecules and oxygen molecules.

In yet another embodiment, the fuel cell electrode assembly further includes a second plurality of catalyst regions collectively configured as a catalyst layer in overlaying contact with the plurality of catalyst regions already on the substrate.

In yet another embodiment, the plurality of catalyst regions are each configured to have a first and a second precious metal-containing shell layers and a base metal-containing core layer disposed between the shell layers, wherein the first precious metal-containing shell layer is in overlaying contact with the substrate. In certain instances, the second precious metal-containing shell layer is configured as a plurality of precious metal-containing wires extending longitudinally from the base metal-containing core layer. In certain other instances, the precious metal-containing wires are provided with a length-to-diameter aspect ratio of 0.1 to 1000. Without being limited to any particular theory, the employment of the wires according to one or more embodiments as described herein provides an enhancement of the catalytic surface area from 2 to 200 $cm^2/cm^2$ of the catalyst planar area.

In yet another embodiment, the fuel cell electrode assembly further includes an intermediate coating material disposed between the core layer and at least one of the shell layers, the intermediate coating material being in electronic communication with at least a portion of the shell layers.

In yet another embodiment, at least a portion of the precious metal-containing wires include 2 to 20 atomic layers of precious metals.

According to another aspect of the present invention, a method is provided for forming a fuel cell electrode assembly. In one embodiment, the method includes providing a substrate defining a substrate surface area, providing a plurality of catalyst regions including a number of atomic layers of catalyst metals and collectively defining a catalyst surface area smaller than the substrate surface area, and contacting the substrate with the plurality of catalyst regions to form the fuel cell electrode assembly.

In another embodiment, the method further includes depositing catalyst metals onto an intermediate substrate to form the plurality of catalyst regions and transferring the plurality of catalyst regions from the intermediate substrate onto the substrate.

In another embodiment, the step of providing the plurality of catalyst regions includes masking the substrate with a masking screen having a plurality of openings, depositing catalyst metals onto the substrate through the openings to form the plurality of catalyst regions, and removing the masking screen to obtain a fuel cell electrode assembly formed of the substrate supporting the plurality of catalyst regions.

In yet another embodiment, the method further includes, prior to the step of removing the masking screen, depositing non-precious metals as a core layer onto the catalyst metals through the openings such that the catalyst metals are positioned between the substrate and the core layer of non-precious metals.

In yet another embodiment, the method includes the steps of imprinting the substrate with a plurality of embossing patches resembling the profile of the catalyst regions to create corresponding impression, removing the embossing patches, and depositing catalyst metals onto the impression to generate the catalyst regions.

BRIEF DESCRIPTION OF THE DRAWINGS

FIG. 1A1 depicts a top plan view of a fuel cell electrode assembly according to one embodiment of the present invention;

FIG. 1A2 depicts an enlarged view of a section of the fuel cell electrode assembly of FIG. 1A1;

FIG. 1A3 depicts a schematic cross-sectional view of the section of the fuel cell electrode assembly of FIG. 1A2;

FIG. 1A4 depicts an enlarged view of the section of FIG. 1A3;

FIG. 1A5 depicts an enlarged view of a catalyst patch of FIG. 1A2;

FIG. 1B1 depicts a conventional fuel cell electrode system containing platinum nano-particles supported on carbon;

FIG. 1B2 depicts an enlarged view of a section of the conventional fuel cell electrode system of FIG. 1B1;

FIG. 1B3 depicts an enlarged view of a conventional platinum (Pt) nano-particle of FIG. 1B2;

FIGS. 2A-2C schematically depict process steps for forming the fuel cell electrode assembly of FIG. 1A1 according to another embodiment of the present invention;

FIG. 3A-3C schematically depict process steps for forming the fuel cell electrode assembly of FIG. 1A1 according to yet another embodiment of the present invention;

FIGS. 4A-4C schematically depict process steps for forming the fuel cell electrode assembly of FIG. 1A1 according to yet another embodiment of the present invention;

FIG. 7A-7B depict a schematic view of a fuel cell cathode employing the fuel cell electrode assembly of FIG. 1A1 according to yet another embodiment of the present invention;

FIGS. 8A-8D depict an exemplary fuel cell electrode assembly in the form of a catalyst coated membrane (CCM) according to the example described herein;

FIGS. 9A-9C depict SEM micrographs in increasing magnification of an array of platinum dots supported on a gas diffusion layer (GDL) to form GDE, in contrast to the configuration of a CCM per FIGS. 8A-8D;

DETAILED DESCRIPTION OF ONE OR MORE EMBODIMENTS

Figure 5A:
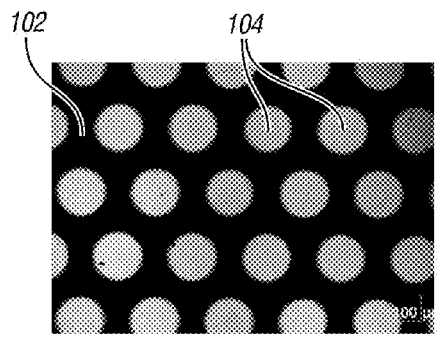
FIGS. 5A-5C schematically depict process steps for forming the fuel cell electrode assembly of FIG. 1A1 according to yet another embodiment of the present invention.

As required, detailed embodiments of the present invention are disclosed herein. However, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or a representative basis for teaching one skilled in the art to variously employ the present invention.

Moreover, except where otherwise expressly indicated, all numerical quantities in the description and in the claims are to be understood as modified by the word "about" in describing the broader scope of this invention. Also, unless expressly stated to the contrary, the description of a group or class of material as suitable or preferred for a given purpose in connection with the invention implies that mixtures of any two or more members of the group or class may be equally suitable or preferred.

Fuel cells have been pursued as a source of power for transportation because of their high energy efficiency and their zero greenhouse emissions to the environment. However, broad commercialization of the fuel cells has been met with many limitations, particularly in relation to the relatively high cost of the fuel cell catalyst. Some of catalyst metals as used in fuel cell applications include noble and transition metals, such as platinum, which are very expensive. An amount of about 0.5 to 4 milligrams per square centimeter precious metals such as platinum is often required for a conventional fuel cell catalyst. It has been estimated that the total cost of the precious metal catalysts is up to 75 percent (%) of the total cost of manufacturing a low-temperature fuel cell.

One source of the high cost of fuel cell catalysts may be attributed to the inefficient catalyst use. By way of example, and as shown in FIGS. 1B1-1B3, some conventional fuel cells employ Pt nano-particles 122 supported on a carbon material 120. Depicting an enlarged cross-sectional view of the Pt nano-particle 122 of FIG. 1B2, FIG. 1B3 shows that the conventional Pt nano-particles 122 are formed of a packing of Pt atoms 124. As known in the art, these Pt nano-particles 122 are often provided with a particle diameter "d" of about 2 to 20 nanometers, which corresponds to about 200 or more atomic layers of Pt atoms. However, only a few surface atomic layers of the Pt nano-particles 122 are accessible to fuel cell reactants and remain active for electrochemical reaction, while the majority of the atomic layers toward the center of the Pt nano-particle 122 remain essentially inactive. In addition, and as shown in FIG. 1B2, convention Pt nano-particles 122 are discrete particles relative to each other. Due to their inherently high surface energy, these conventional Pt nano-particles 122 tend to aggregate to form larger particles and thereby lose catalytically active area, and may actually dissolve into the electrolyte membrane and consequently lose catalytic activities.

Another limitation associated with certain conventional fuel cell systems is ineffective control for flooding and reactant transport. By way of example, certain reactants including oxygen/hydrogen gas, water, and protons cannot easily move across the catalyst sheet and as a result, little or no electrochemical reaction happens. Moreover, even if some oxygen gas, hydrogen gas, and proton do move across the catalyst sheet, resultant water molecules cannot move across the catalyst sheet and therefore often results in water flooding.

One or more embodiments of the present invention, as will be described in more detail below, alleviate some of the above-identified issues associated with the conventional fuel cell systems.

According to one aspect of the present invention, a fuel cell electrode assembly is provided. In one embodiment, and as depicted in FIGS. 1A1-1A3, the fuel cell electrode assembly generally shown at 100 includes a substrate 102 having a substrate surface area illustratively defined by corners c1, c2, c3, and c4, and a plurality of catalyst regions 104 in overlaying contact with the substrate 102 and having a catalyst surface area illustratively defined by the sum of the surface areas of all the catalyst regions 104.

An area differential generally shown at 106 as the unshaded area in FIG. 1A2 indicates the sum of areas on the substrate 102 that not intentionally placed in contact with the catalyst regions 104. Therefore the area differential 106 is substantially free of any catalyst materials.

In one or more embodiments, the term "substantially free" refers to an extent of being less than 10 percent, 5 percent, or 1 percent by weight, volume, length or degree, and in some instances means that a substance is not purposefully added and whose presence, if any, is only incidental.

The area differential 106 collectively forms a passage way between the catalyst regions 104. Without being limited to any particular theory, it is believed that water molecules are able to pass by simple diffusion mechanism through the non-catalytic area differential 106, or the passageway, on the substrate 102 such as a proton electrolyte membrane (PEM), gaseous reactants and products after passing through the non-catalytic area differential 106 can diffuse to/from the GDL from/to the catalyst regions 104. Consequently, reactant consumption limitations and flooding due to water accumulation at the fuel cell electrode can be effectively reduced.

The substrate 102 can be a PEM or a gas diffusion layer (GDL). The fuel cell electrode assembly 100 can be used in an anode and/or a cathode in a fuel cell. The catalyst regions 104 can be of any suitable geometric shapes and/or any suitable sizes. By way of example, the catalyst regions 104 each can be of the form of a square, a rectangle, a triangle, a circle, a trapezoid, or any combination thereof. In certain instances, the catalyst regions 104 are a plurality of spaced apart circles in an array format as illustratively shown in FIG. 5A.

In one or more embodiment, and according to FIGS. 1A1-1A3, the catalyst regions 104 are each provided with an aspect ratio defined by the ratio of the planar liner dimension "m" of the catalyst region 104 of FIG. 1A2 relative to a thickness dimension "z" of the same catalyst region 104 shown in FIG. 1A3. The planar linear dimension is the largest linear distance between any two points on an outer perimeter of the catalyst region 104 and varies with the shape of the catalyst region 104. When the catalyst regions 104 take the shape of a square or a rectangle, the planar linear dimension "m" is the diagonal distance of the square or rectangle. When the catalyst regions 104 take the shape of a circle, the planar linear dimension "m" can be the diameter of the circle. In certain instance, the thickness dimension "z" is substantially perpendicular to the planar surface of the substrate 102. In certain other instances, an aspect ratio of the planar linear dimension "m" relative to the thickness dimension "z" of the catalyst regions 104 is greater than 100, 500, 1,000, 5,000, or 10,000.

In one or more embodiments, the term "substantially" refers to an extent of being greater than 75 percent, 85 percent, or 95 percent by weight, volume, length or degree.

FIG. 1A5 depicts an enlarged top plan view of the catalyst region 104 of FIG. 1A2. As shown in FIG. 1A5, the catalyst region 104 is formed of catalyst metals 112 contiguously aligned next to each other and together forming a substantially planar atomic layer of the catalyst metals 112. In yet another embodiment, and as shown in FIGS. 1A2 and 1A5, the catalyst region 104 takes the shape of a rectangle, having a width "x" and a length "y". It is appreciated that at least one of the width "x" and length "y" is a value greater than or equal to the diameter "d" of a conventional Pt nano-particle 122. In this regard, at least one of the width "x" and the length "y" is greater than 20 nm, 50 nm, 100 nm, or 150 nm. In certain instances, "x" can be as small as a catalyst atom diameter, while "y" can be any suitable length to provide the desirable catalytic surface area, and "z" can take any suitable value.

As used herein, in one or more embodiments, the term "substantially planar atomic layer" refers to an arrangement of catalyst metals 112 in a substantially planar continuum film, wherein the term "continuum" refers to a continuous extent, succession, or whole, no part of which can be distinguished from neighboring parts except by arbitrary division, and wherein the term "substantially planar" refers to that no less than 75 percent, 85 percent, or 95 percent by area of the atomic layer 110 is parallel to the planar surface of the substrate 102. U.S. patent application titled "Catalyst Layers Having Thin Film Mesh Catalyst (TFMC) Supported on a Mesh Substrate and Methods of Making the Same" with Ser. No. of 12/495,839, provides a detailed description of the "continuum" or "thin film" atomic layers of catalyst metals, the entire contents thereof are incorporated herein by reference.

Unlike Pt atoms 124 contained within the conventional Pt nano-particles 122 wherein the Pt atoms 124 are randomly packed and being in an unstable energy state, the catalyst atoms 112 contained within the substantially planar continuum film 110, according to one or more embodiments of the present invention, together form a continuum as they have attained their desirable coordination number and relatively low surface energies mimicking catalyst metals in bulk. For instance catalyst metal atoms in bulk are strongly bonded to each other and therefore more resistant to catalyst dissolution.

The catalyst regions 104 can be provided with any suitable thickness dimension "z". By way of example, the catalyst regions 104 can take up a thickness dimension "z" corresponding to 1 to 250 atomic layers 110, 1 to 200 atomic layers 110, 1 to 100 atomic layers 110, 1 to 50 atomic layers 110, or 1 to 20 atomic layers 110. The adaptability of the fuel cell assembly 100 to be used for providing the catalyst regions 104 having no more than 20 atomic layers of the catalyst metals 112, as described herein and according to one or more embodiments of the present invention, presents a clear departure from the conventional Pt nano-particles 122 wherein on an average more than 20 Pt atomic layers, and in certain instance more than 200 Pt atomic layers, are involved in each nano-particle 112. In the arrangement as described herein, the fuel cell electrode assembly 100 can be constructed with a significantly reduced consumption of the costly catalyst metals 112 such as platinum group metals. Because the catalyst regions 104 are provided with just the amount of atomic layers of the catalyst metals 112, for instance 1 to 20 atomic layers, needed by and accessible to the fuel cell reactants, the fuel cell electrode assembly 100 is thus configured to reduce the precious catalyst metal consumption without having to sacrifice electrochemical performance of a resultant fuel cell. Moreover, each atom 112 (FIG. 1A4), by virtue of being part of a catalyst region 104, is intrinsically more active than each atom 124 in the conventional nano-particle 122. Therefore, fewer catalyst atoms are needed which in turn reduces the consumption of precious catalyst metals.

In yet another embodiment, and as depicted in FIGS. 4A-4C, the catalyst regions 104 may be arranged to have a core-shell configuration, wherein a catalyst core layer 104b is disposed between two catalyst shell layers 104a, 104c. The catalyst core layer 104b illustratively include relatively less precious metals such as any suitable base metals including cobalt, nickel, copper, iron, yttrium, their oxides, polymer, plastic, or combinations thereof. When used, the polymer is believed to assist the proper orientation of the catalyst metals as deposited in forming the shell layers 104a, 104c. In particular, substrate material can promote growth of catalyst metals in (111), (100), or other desirable orientations. The catalyst shell layers 104a, 104c illustratively include relatively more precious catalyst metals including one or more platinum group metals, their oxides, or combinations thereof. In certain instances, the core-shell catalyst regions 104 include $Pt_3Co$, $Pt_3Cu$, $Pt_3Ni$, and combinations thereof. In certain particular instances, the core-shell catalyst regions 104 include $Pt_3Ni$ alloys. It is noted the present invention is not limited to the types of the core-shell catalyst employed, rather any binary, ternary, quarterly, or other suitable forms of the relatively more precious metals for the shell and the relatively less precious metals and/or polymers for the core can be used.

In yet another embodiment, the catalyst regions 104 can be configured to further include an intermediate material (not shown) disposed between the catalyst core layer 104b and the catalyst shell layer 104a and/or 104c. The intermediate material can be a polymer to facilitate the proper atomic orientation of the catalyst metals 112. The intermediate material is optionally in electronic and/or lattice communication with at least a portion of the core layer 104b and the shell layers 104a and 104c. Non-limiting examples of the polymers include polyamides such as Kapton from Dupont, polyesters, and polyaramids. Non-limiting examples of the intermediate material may include magnesium, zirconium, niobium, molybdenum, aluminum, cobalt, copper, nickel, tantalum, tungsten, iron, titanium, their oxides, or combinations thereof. Non-limiting examples of the intermediate material may also include semi-conductors such as germanium, silicon, or their oxides; and organic materials such as polynuclear aromatic hydrocarbons, heterocyclic aromatic compounds. Chapters 30 and 31 of "Organic Chemistry" by Morrison and Boyd, $3^{rd}$ edition, Allyne and Bycon, 1974, provide a good description of the heterocyclic aromatic compounds, the entire contents thereof are incorporated herein by reference.

Electronic communication or interaction between the catalyst metals 112 and the intermediate material can affect the nature and strength of bonding there between and thereby modify the catalytic reactivity of the catalyst metals 112. Without being limited to any particular theory, it is believed that by choosing an intermediate material to provide a pre-coating prior to depositing the catalyst metals, the catalytic activity can be fine tuned toward a desirable chemical and/or electrochemical reaction, for instance, oxygen reduction reaction.

Without being limited to any particular theory, it is believed that mismatch between the lattices of the intermediate coating and the catalyst metals can either lead to compression or expansion of the catalyst metals. The compression or expansion has direct effect on the catalytic activity of the catalyst metals. Therefore, by adjusting the lattice structure on the intermediate coating material, one can adjust the catalytic activity of the intermediate coating material towards the catalytic reaction. Further, surface energy of the intermediate coating material is a factor affecting the growth of the desirable orientations of catalyst thin film. In other words, the surface energy of the catalyst metals and the lattice mismatch between the intermediate coating material and the catalyst metals can promote growth of catalyst thin film with a desirable orientation.

In yet another embodiment, the catalyst regions 104 are substantially free of carbon black or other carbon containing materials. In certain instances, the catalyst regions 104 and/or the area differential 106 contain less than 5 weight percent, 4 weight percent, 3 weight percent, 2 weight percent, 1 weight percent, 0.5 weight percent, or 0.05 weight percent of carbon black. Without being limited by any particular theory, it is believed that carbon black or porous carbon can assist in reactants transport and water management. In addition, carbon black or porous carbon can be applied as an ink. Other suitable additives that may adjust and control the hydrophobicity and proton conductivity in catalyst layer, such as Teflon™, proton conducting ionomers, can also be used.

Figure 5B:
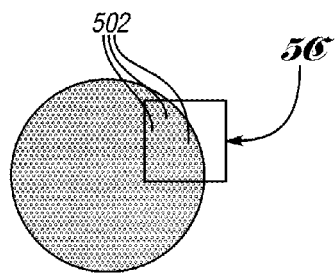
Figure 5C:
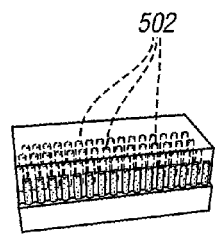

In yet another embodiment, and as depicted in FIGS. 5A-5C, any one of the catalyst regions 104 can be configured to include a plurality of wires 502 extending substantially longitudinally from the substrate 102. FIG. 5B depicts an enlarged view of one of the catalyst regions 104 of FIG. 5A. FIG. 5C depicts a further enlarged view of the catalyst patch 104 of FIG. 5B, showing wires extending longitudinally from the substrate 102. The wires 502 can be formed via anodized aluminum oxidation according to the example described herein.

In one or more embodiments, the term "wires" or "nanowires" are used interchangeably. The term "nanowire" does not necessarily indicate the wires are of dimensions in nanometer scale. The wires or the nanowires may have an average diameter in nanometer scale and/or an average length in micrometer scale.

Figure 6A:
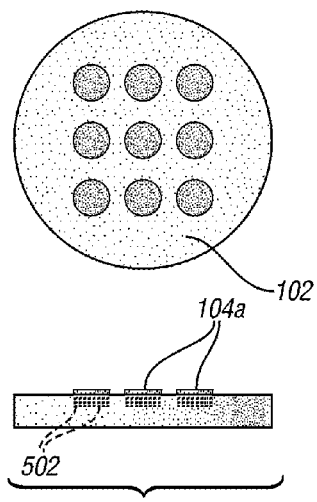
FIGS. 6A-6C schematically depict process steps for forming the fuel cell electrode assembly of FIG. 1A1 according to yet another embodiment of the present invention.
Figure 6B:
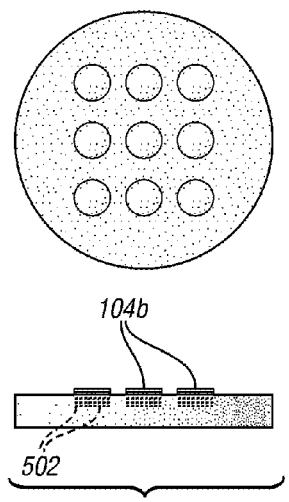
Figure 6C:
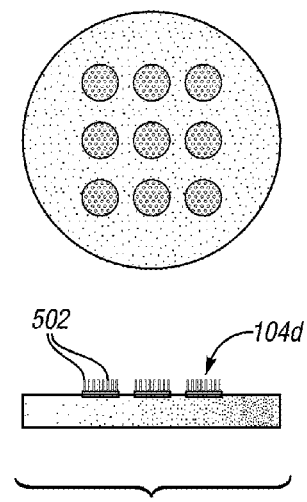

In yet another embodiment, and as depicted in FIGS. 6A-6C, the catalyst regions 104 can be arranged to have a core-shell configuration similar to that in relation to FIG. 4A-4C, combined with a layer of wires 104d which can be formed according to FIGS. 5A-5C. Consequently, the catalyst regions 104 according to FIGS. 6A-6C are provided with a first catalyst shell layer 104a which is in overlaying contact with the substrate 102, a core layer 104b, and a second catalyst shell layer 104d configured to include a plurality of wires 502 extending longitudinally in a thickness direction or in a direction substantially transverse to a planar surface of the substrate 102.

In yet another embodiment, and as shown in FIGS. 6A-6C, the first catalyst layer 104a can also be similarly configured, like the second catalyst layer 104c, to include a plurality of wires 502 extending longitudinally in a thickness direction or in a direction substantially transverse to the planar surface of the substrate 102. In this configuration, the plurality of wires 502 as present on the first catalyst layer 104a and the plurality of wires 502 on the second catalyst layer 104c are directed away from each other.

In one or more embodiments, it is appreciated that the wires as described herein can be formed of non-precious metals such as nickel, cobalt, gold, and/or polymer and a continuum thin film of the catalyst metals such as platinum or platinum alloy can be deposited onto the wires formed out of the non-precious metals. It is also appreciated that the wires as described can be formed entirely of the catalyst metals if needed and suitable for certain particular usage.

In yet another embodiment, wire 502 can be pre-coated with a different material such as polymer and/or metal oxides. The catalyst that is later deposited onto the pre-coated wire 502 is expected to have preferred crystalline orientation and improved activity.

In yet another embodiment, and as depicted in FIGS. 7A-7B, the catalyst regions 104 having the core-shell configuration according to FIGS. 6A-6C can be disposed between a PEM 702 and a GDL 704, wherein the first and second catalyst shell layers of the catalyst regions 104 are in contact with the PEM 702 and the GDL 704 respectively.

Unlike conventional carbon-supported fuel cell catalyst wherein catalyst metals are present in discrete nano-particles such as one illustratively shown in FIGS. 1B1-1B2, wherein electronic connection between the discrete particles is provided through the carbon support material, the catalyst metal atoms of the catalyst regions 104 having catalyst atoms presented in a continuum film according to one or more embodiments of the present invention are substantially connected to each other electronically without the need for an intermediate connecting medium such as carbon.

According to another aspect of the present invention, a method is provided for forming the fuel cell electrode assembly 100. In one embodiment, and as depicted in FIGS. 2A-2C, the method includes overlaying a substrate 102 with a masking screen 202 having a plurality of openings 204, through which catalyst metals can be deposited onto the substrate 102 to form the catalyst regions 104. A specific example of the method is provided in the Example section.

In another embodiment, and as depicted in FIGS. 3A-3C, the method includes depositing catalyst metals onto an intermediate support 302 to form the catalyst regions 104, wherein the intermediate support 302 can be silica based or of other thermally stable materials. Subsequently, the catalyst metals are subject to an annealing process per FIG. 3B wherein catalyst metal alloys are arranged via the annealing process to present the desirable catalytic properties. The catalyst regions 104 thus formed are then transferred onto the substrate 102 via a decal process per FIG. 3C to form the fuel cell catalyst assembly 100. This method is particularly useful when the catalyst regions 104 are formed of metal alloys, such as the highly active platinum nickel alloy, Pt3Ni.

In yet another embodiment, an array of patches (not shown) resembling the catalyst regions 104 can be used to imprint or emboss the substrate 102 to create impression, upon which the catalyst metals 112 can be directly deposited to create the catalyst regions 104. Alternatively, the array of patches may also include wires 502, together they can be used to imprint or emboss the substrate 102 to create impression, upon which the catalyst metals 112 can be directly deposited.

Referring back to FIGS. 1A1-1A3, the PEM 102 may be made of any suitable polymer electrolyte or its derivatives. The polymer electrolytes useful in the present invention illustratively include copolymers of tetrafluoroethylene and one or more fluorinated, acid-functional comonomers. Typical polymer electrolytes include Nafion® (DuPont Chemicals, Wilmington Del.) and Flemion™ (Asahi Glass Co. Ltd., Tokyo, Japan). While Nafion® is a common PEM, the usefulness of this invention is not limited by a particular choice of Nafion or any other solid electrolyte. In fact, liquid electrolytes and solid electrolytes are both amenable to one or more embodiments of the present invention.

Referring back to FIGS. 1A1-1A3, the area differential 106 is provided for passing certain fuel cell reactants. The area differential 106 allows direct or facile passage of protons/water and gases through the openings provided therein, while transfer of electrons to and from the reaction site may take place rapidly through the continuous conductive thin film of catalyst to or from the GDL. As used herein, in one or more embodiments, the term "fuel cell reactants" refers to gases and liquids ordinarily involved in a fuel cell electrochemical reaction. Fuel cell reactants include many species depending upon the fuel cell type. Examples of the hydrogen fuel cell reactants include oxygen gas, hydrogen gas, oxygen ions, hydrogen ions, and water molecules.

The catalyst regions 104 may take any suitable geometric shapes. Non-limiting examples of the shapes include circles, squares, rectangles, triangles, and trapezoids.

The wires 502 can be made of any suitable materials, including gold, ceramics, nickel, steel, copper, iron, cobalt, chromium, plastics, polymers, and combinations thereof. The surface of the wires 502 can be provided with surface features to better accommodate catalyst film growth for the desired crystalline structure.

In yet another embodiment, the catalyst regions 104 contain catalyst metals arranged as a catalyst continuum film. The catalyst continuum film can be configured to have any suitable thickness for an intended design. In certain instances, the platinum continuum film can be formed of 1 to 20 atomic layers. A total thickness of the platinum continuum film is in a range of 0.1 to 500 nanometers, 2 to 450 nanometers, 10 to 400 nanometers, or 25 to 350 nanometers. In general, the thinner the continuum film, the less the catalyst loading and expenditure. However, it should be noted that the thickness of the continuum film of the catalyst regions 104 does not restrict in any way the practice of the present invention. The thickness of the continuum film may be controlled to provide a desirable loading of the metallic catalyst. The thickness can be optionally controlled by using the core-shell structure wherein the non-precious core can be made of any desirable thickness followed by a coating of shell catalyst.

In yet another embodiment, the catalyst regions 104 include catalyst metals 112 configured as single crystalline, polycrystalline, or combinations thereof. In the event that the single crystals of platinum are used, the single crystals of preference are characterized as having (111) and/or (110) facets. In certain particular instances, the single crystals are each provided in the thickness direction with 1 to 20 atomic layers, such that precious catalyst metals can be effectively used. Alternatively, in the event that the polycrystalline crystals are used, the preferred polycrystalline for platinum or platinum containing alloys is characterized as having (111) facets and (100) tops. The performance of the (100) and (111) crystal surface of bulk catalyst metal such as platinum is far superior to conventional platinum nano-particles. Because the catalyst such as platinum can be grown in single crystals and configured as a thin continuum film on the mesh substrate having nanowires, this catalyst behaves more like the bulk metal catalyst with preferred crystalline structure and is provided with relatively higher catalytic activity per a given surface relative to the catalyst in conventional nano-particle configuration, thereby reducing precious catalyst consumption.

In yet another embodiment, the catalyst regions 104 include alloy Pt$_3$Ni with "Pt-Skin" and "Core-Shell" catalysts in a non-limiting "sandwich" type of configuration. The Pt-skin in the core-shell catalyst can be formed of Pt atoms arranged in atomic layers as described herein and behave more like metal atoms in bulk. Stamenkovic et al., titled "surface composition effects in electrocatalysis: kinetics of oxygen reduction on well-defined PtNi and PtCo alloy surfaces," Journal of Physical Chemistry B; 2002, 106(46), 11970-11979, discloses the aforementioned concept of bulk metal catalyst, the entire contents thereof are incorporated herein by reference.

Stamenkovic et al., titled "Improved Oxygen Reduction Activity on Pt$_3$Ni(111) via Increased Surface Site Availability," Science, vol. 315, 2007, the entire contents thereof being incorporated herein by reference, discloses that metal atoms in bulk such as Pt$_3$Ni(111) are approximately 90 times more active than platinum nano-particles on carbon with almost two orders of magnitude improvement. Pure bulk platinum is known to have almost 10 times more activity per catalyst surface area than the Pt nano-particles. Therefore, with the continuum or thin film configuration of the Pt metal atoms arranged in the Pt-skin for the core-shell catalysts, the present invention in one or more embodiments enables the performance of catalyst metal more like metal atoms in bulk and therefore more active than the conventional Pt on carbon nano-particles. Conventional systems in utilizing Pt$_3$Ni catalyst in fuel cells are met with challenges of creating catalyst bulk having electronic and morphological properties similar to Pt$_3$Ni(111). Given that the catalyst metals can be configured as thin continuum film which is grown into well defined crystalline surfaces, the incorporation of Pt$_3$Ni(111) to fuel cells can be realized and practiced with greater certainty.

One example of the core-shell substructures that can be employed in the catalyst regions 104 according to one or more embodiments of the present invention is illustratively shown in Zhang et al., titled "platinum monolayer on nonnoble metal-metal core-shell nanoparticle electrocatalysts for O$_2$ reduction," Journal of Physical Chemistry B, 2005, 109(48), 22701-22704, the entire contents thereof are incorporated herein by reference.

Deposition of catalyst atoms 112 for forming the catalyst regions 104 can be accomplished by sputtering using vapor deposition, atomic layer deposition (ALD), PVD, CVD, electro-deposition, and colloidal methods. Due to the relatively lower surface energy inherent within the continuum film of catalyst atoms described herein according to one or more embodiments of the present invention, the resultant catalyst layer 110 is provided with relatively higher stability and activity. Thus, the concept of bulk metal catalyst such as the bulk metal construction of Stamenkovic et al. referenced herein can be effectively employed in the catalyst regions 104 according to one or more embodiments of the present invention.

The catalyst regions 104 can be mass produced using stamping or electro-deposition techniques for micro- or nano-fabrication. Non-limiting stamping methods are disclosed in Mirkin et al., "Emerging methods for Micro- and nanofabrication", MRS bulletin, July 2001; Walker et al. "Growth of thin platinum films on Cu (100): CAICISS, XPS and LEED studies", Surface Science 584(2005) 153-160; and Y. Xia et al., "Unconventional methods for fabricating and patterning nano structures," Chem. Rev., 1999, vol. 99, pp 1823-1848. The entire contents of these methods are incorporated herein by reference. Nanofabrication methods, such as soft lithography have also been used to transfer an array of openings to a metallic thin film of gold with thickness of 100 nanometers (nm). As such, the TFAC substrate having nanowires can be used to support the continuum film of the metallic catalyst to form the fuel cell catalyst layers. Non-limiting nanofabrication methods are disclosed in "Patterned transfer of metallic thin film nano-structures by water-soluble polymer templates" authored by C. D. Schaper, Nano Lett., Vol. 3, No. 9, pp 1305-1309, 2003, the entire contents thereof are incorporated herein by reference.

Vacuum deposition techniques, preferably electron beam physical vapor deposition (EB-PVD) or RF sputtering, may be used to deposit, atom by atom, the catalyst metals for forming the catalyst regions 104. Any suitable stamping techniques for micro or nano-fabrication applications can be used to manufacture the mesh substrate support according to one or more embodiments of the present invention. For instance, nanofabrication methods, such as soft lithography can be used to illustratively transfer a pattern of catalyst regions such as region of 104 of a metallic thin film to a GDL or a PEM. This substrate may easily be adapted to manufacture TFAC based catalyst layers.

As described herein above, one or more embodiments of the present invention can reduce catalyst dissolution. Although not intending to be bound to any particular theory, degradation due to particle dissolution may be reduced since catalyst metals presented as a continuum film are intrinsically more stable than conventional catalyst nano-particles due to the lower surface energy associated with films. Moreover, catalyst agglomeration inherent in conventional carbon-supported catalyst nano-particles can be effectively reduced. Degradation due to particle agglomeration may also be reduced.

A further advantage of one or more embodiments of the present invention is a reduction or elimination of carbon materials in the catalyst regions. As a result, issues such as carbon support corrosion and large Ohmic losses for electron transfer through carbon support may be reduced because of the reduction of carbon materials used to support the catalyst metals. Furthermore, peroxide formation that degrades membranes is significantly reduced.

Having generally described this invention, a further understanding can be obtained by reference to certain specific examples which are provided herein for purposes of illustration only and are not intended to be limiting unless otherwise specified.

EXAMPLES

Example 1

An Illustrative Method for Forming a Fuel Cell Catalyst Assembly as Described Herein FIGS. 2A-2C schematically depict process steps for forming the fuel cell electrode assembly of FIG. 1A1 according to one or more embodiments of the present invention. As depicted in FIGS. 2A-2C, vacuum sputtering is used to deposit platinum dots as a particular form of the catalyst regions 104 onto the substrate 102, either a PEM or a GDL. A stainless steel perforated sheet is used as a masking screen. The stainless steel perforated sheet has holes of diameter 152 micrometers with a staggered pattern having a center to center spacing of 285 micrometers and a thickness of 127 micrometers. The thickness of platinum deposit is 2.5 nanometers. The array of catalyst regions 104 is generated on both a 1200-W series GDL from E-Tek and 112 Nafion membrane from Dupont. A commercially available design for serpentine flow field from Fuel Cell Technologies (FCT) with 5 cm$^2$ active area is used for the anode and the cathode. A conventional GDE from E-TEK (12-W seires) with 5 g Pt/m$^2$ is used for the anode in all cases, while the cathode is the CCM or GDE described herein. FIGS. 8A-8D depict an exemplary fuel cell electrode assembly containing platinum dots on 112 Nafion membrane with increasing magnification. FIGS. 9A-9C depict SEM micrographs in increasing magnification of an array of platinum dots supported on a gas diffusion layer (GDL) to form GDE, in contrast to the configuration of a CCM per FIGS. 8A-8D.

Example 2

Open Circuit Voltage Test of the Exemplary Fuel Cell Catalyst Assembly According to Example 1

Figure 10:
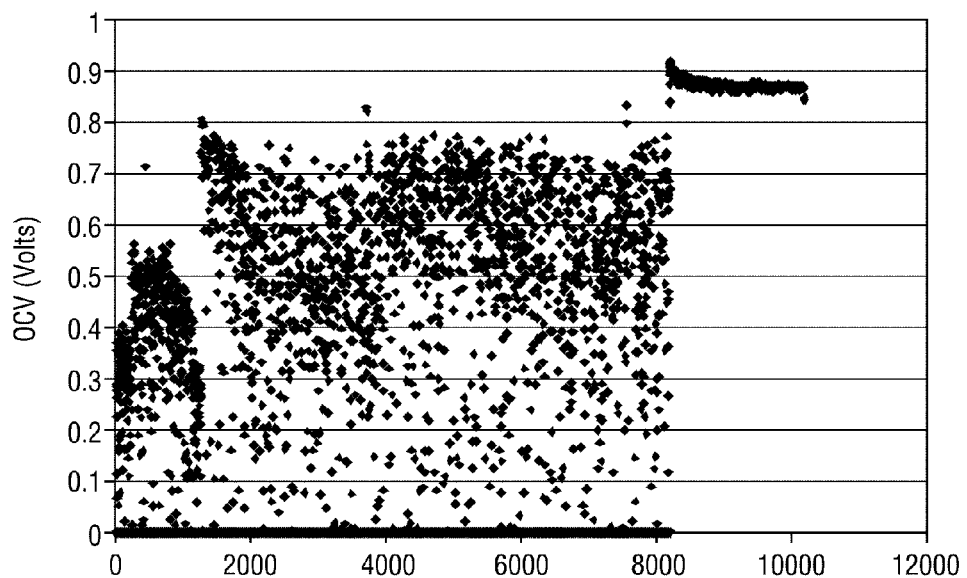
FIG. 10 depicts open circuit voltage (OCV) as a function of data acquisition cycle of the exemplary fuel cell electrode assembly of FIG. 9A.

A 5 $cm^2$ cell setup from Fuel Cell Technologies is used for evaluating voltage/current characteristics of the exemplary fuel cell catalyst assembly of Example 1. The cell temperature is set at 70° C. with an anode/cathode flow rate of 300/1000 sccm (standard cubic centimeters per minute) for an ambient exhaust. Depicting open circuit voltage (OCV) as a function of data acquisition cycle without fine tuning of the exemplary fuel cell catalyst assembly, FIG. 10 shows the assembly attains an OCV of 0.92 volts after 8000 seconds or 2.2 hours, which represents an acceptable 4-electron oxygen reduction reaction activity giving cell voltage of 0.7 volts or better. This experiment is design to mimic the "worst case scenario" wherein the cell is not properly conditioned or fine tuned.

Example 3

Polarization Curve Analysis of the Exemplary Fuel Cell Catalyst Assembly According to Example 1

Figure 11:
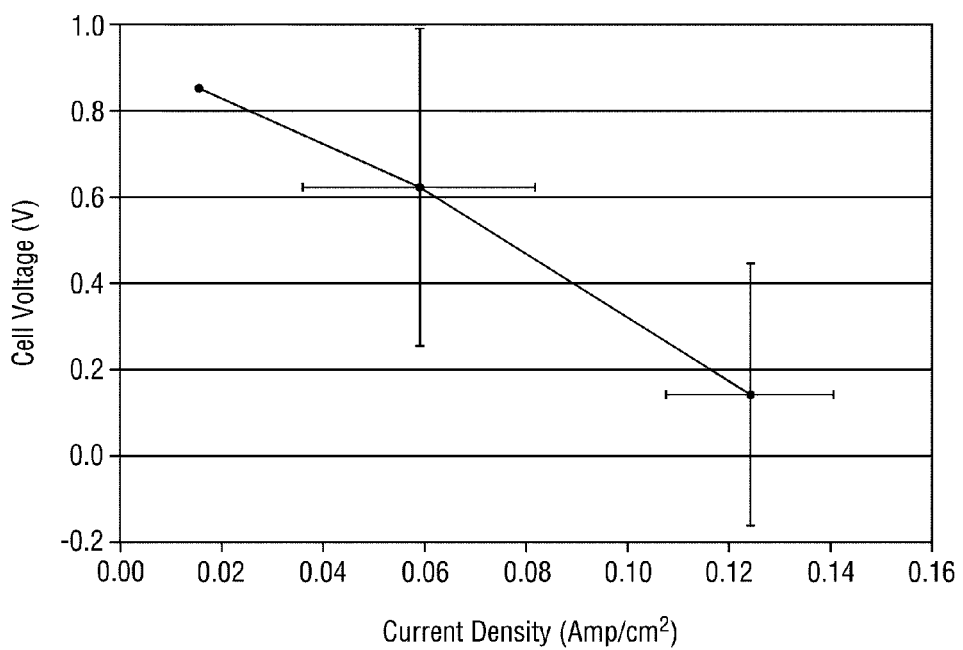
FIG. 11 depicts cell voltage as a function of current density tested on the exemplary fuel cell electrode assembly of FIG. 9A according to the example described herein.
Figure 12A:
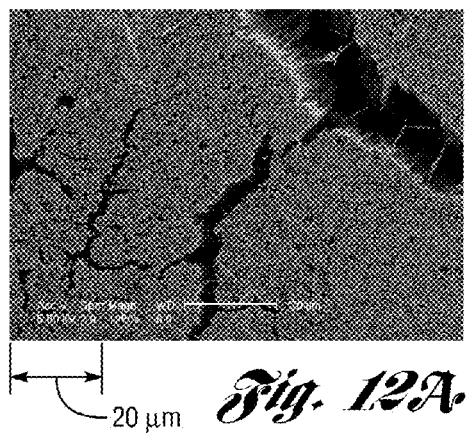
FIGS. 12A-12E depict SEM (scanning electron microscope) images in increasing magnification of wires generated to enhance the catalytic surface area according to the example described herein.
Figure 12B:
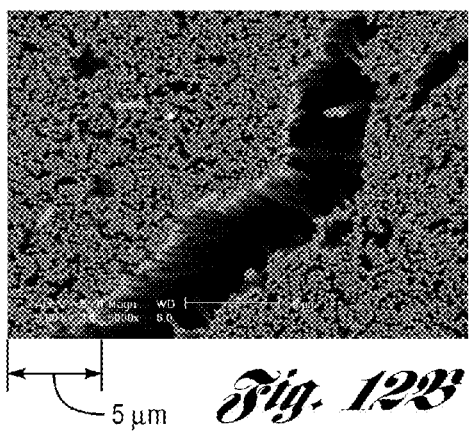
Figure 12C:
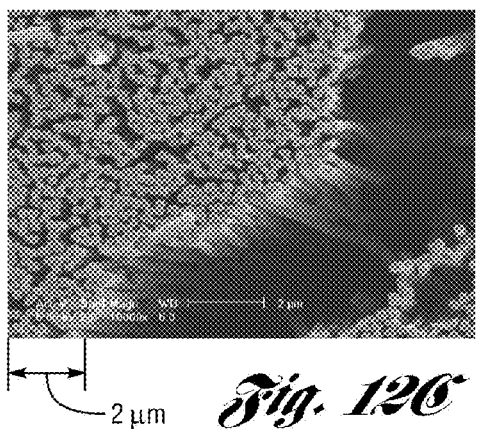
Figure 12D:
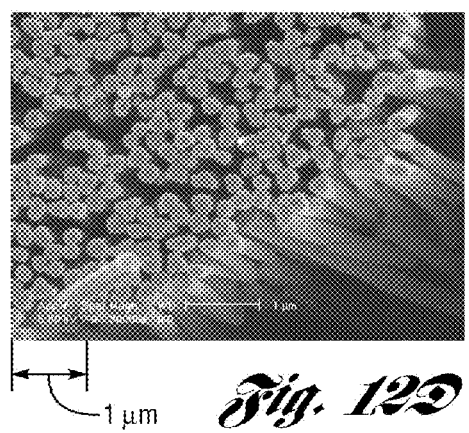
Figure 12E:
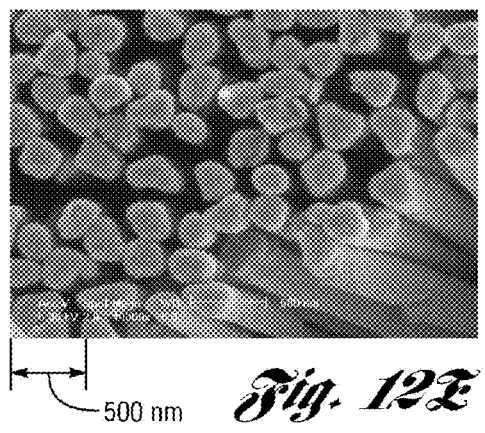

Because the G50 instrument is designed for larger cells with larger current output, for instance having surface area of 50 $cm^2$ or greater, a proper polarization curve is difficult to obtain. A proper polarization curve refers to a polarization curve that covers a relatively broader range of currents and voltages, substantially free of noises as depicted in FIG. 11. Here, it is surprisingly shown that a partial polarization curve can be obtained. As shown in FIG. 11 which depicts cell voltage as a function of current density tested on the exemplary fuel cell electrode assembly of the Example 1, a maximum electric current of 1.120 Amps at 0.24 Volts is obtained when the assembly is not operated under backpressure, for instance, only being exhausted to ambient. It is believed that relatively better performance would result if the assembly is tested under backpressure. Again, like the experiment in Example 2, this experiment is also carried out to mimic the "worst case scenario" wherein the cell is not properly conditioned, or tested without backpressure.

Example 4

Forming the Wires

Several methods can be used to manufacture the wires as described herein. Among them are evaporation-condensation, vapor-liquid-solid (VLS) growth, and template based.

In this example, commercially available templates such as anodized alumina membrane (AAM) and radiation track-etched polycarbonate (PC) membranes are used. FIGS. 12A-12E depict SEM images, with increasing magnification levels, of a plurality of wires grown using an anodic alumina oxide (AAO) membrane.

Figure 13A:
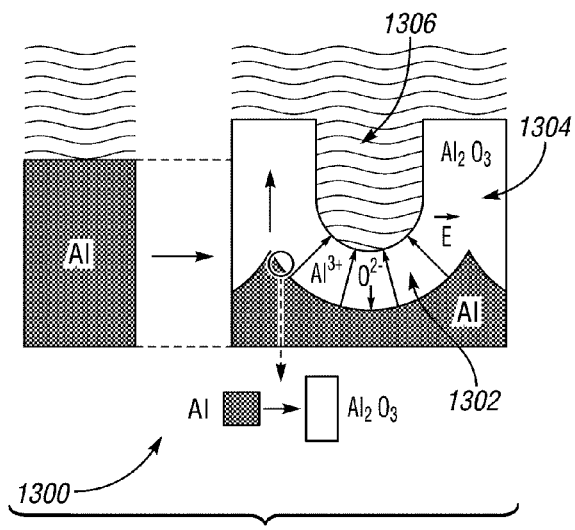
FIGS. 13A-13C depict a schematic view of process steps for forming the pores as a template for the wires according to yet another embodiment of the present invention.
Figure 13B:
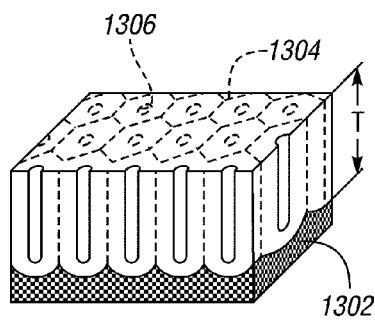

Commonly used alumina membranes having uniform and parallel pores are produced by the anodization of aluminum sheets or films in solutions of sulfuric, oxalic or phosphoric acid. As shown in FIGS. 13A-13B, the pores 1306 can be arranged in a regular hexagonal array as seen in FIG. 13B, and as many as $10^{11}$ pores/$cm^2$ can be obtained. Pore sizes range from 10 nm to 100 μm. After formation of the pores, the barrier oxide layer 1302 at the bottom of the pores 1306 is removed by dissolution in sodium hydroxide and mechanical agitation.

Figure 14A:
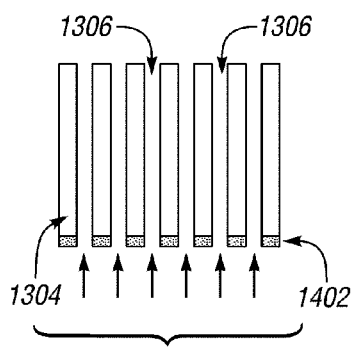
FIGS. 14A-14D depict a schematic view of process steps for forming the wires using the template of FIGS. 13A-13C.
Figure 14B:
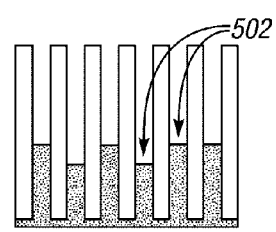
Figure 14C:
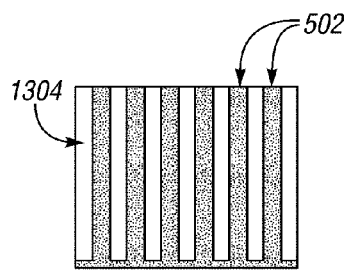
Figure 14D:
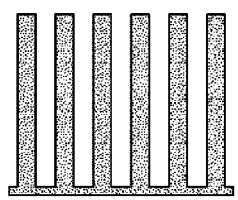

Membrane etching and catalyst electro-deposition follow thereafter according to FIGS. 14A-14D. As depicted in FIG. 14A, a conductive layer 1402 of copper or gold is sputtered onto the bottom of the substrate 1304; as depicted in FIG. 14B, the wires 502 extend in length as electro-deposition continues; as depicted in FIG. 14C, the ends of the wires 502 are polished for desirable smoothness; and as depicted in FIG. 14D, the wires 502 are obtained by removing and etching the membrane 1304 by the use of a base such as NaOH.

Example 5

Specifications Testing of the Wires

Copper wires are grown in an electrochemical cell with templates made of Anodic Alumina Oxide (AAO), with pore diameters of 200 nm, 150 nm and 50 nm. Scanning Electron Microscope (SEM) images are shown in FIGS. 12A-12E. FIGS. 12A-12E depict an enlarged view of a portion of the catalyst region 104 of FIG. 5B, the portion containing a plurality of wires extending from a surface of the portion, with a magnification of 1,250×, 5,000×, 10,000×, 20,000×, and 40,000× respectively.

Figure 13C:
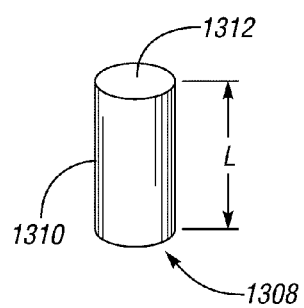

Table I tabulates selected specifications of the wires grown according to the example. Several of the test specifications as referenced in Table I are defined according to the following. With reference to FIG. 13B, a plurality of pores 1306 are created within the AAO membrane 1304, which is provided with an average thickness indicated as "T." The average thickness "T" of the AAO membrane 1304 as employed in this example is about 47-50 μm. For illustration purposes, and as depicted in FIG. 13C, a wire generally shown at 1308 is grown to its length "L" within each of the pores 1306. The length "L" of the nanowires 1500 can be adjusted by controlling the extent of its growth; however, the length "L" should be no greater than the average thickness "T" for the AAO membrane 1304. As referenced in the Table I, pore density is the number of pores 1306 per $cm^2$ of the AAO membrane 1304. In this example, the growth of the wires 1308 can be controlled such that the wires 1308 have an average length of 1-1.3 μm. As referenced in the Table I, peripheral area is the area shown at 1310; basal area is the area shown at 1312; and the total surface area represents the sum of the basal area and the peripheral area times the total number of the wires or the total number of the pores per $cm^2$, plus the free area on the substrate where no wire is grown.

TABLE I

Selected Specifications of the wires Grown

| Pore Diameter nm | AAO Membrane Thickness μm | Pore Density #/$cm^2$ | wire Length μm | Total Surface Area $cm^2$/$cm^2$ growth surface |
|---|---|---|---|---|
| 150 | 50 | 2 × $10^9$ | 1.3 | 12.2 |
| 73 | 47 | 4 × $10^9$ | 1 | 9.2 |
| 55 | 50 | 5 × $10^9$ | 1 | 8.6 |
| 35 | 49 | 1 × $10^{10}$ | 1 | 11.0 |
| 13 | 50 | 1 × $10^{11}$ | 1 | 40.8 |

It is noted that the total surface area shown in Table I is a function of the pore diameter, the pore density, and length of the wires grown.

Example 6

Determining an Appropriate Array Size of the Catalyst Regions Per a Given Design Commercially available metal meshes of different sizes are used as a mask to generate the array patterns and resultant surface areas are calculated. Table II is a worksheet showing various surface areas resulting from different mesh sizes.

TABLE II

| Mesh Size (wires/inch) | mesh opening (μm) | Number of Openings per 1 cm$^2$ | Total Surface Area* (cm$^2$/cm$^2$) |
| --- | --- | --- | --- |
| 1500 | 11 | 348k | 0.44 × 2** |
| 1000 | 18 | 154k | 0.5 × 2 |
| 750 | 25 | 87k | 0.55 × 2 |
| 500 | 39 | 38k | 0.60 × 2 |
| 300 | 66 | 14k | 0.61 × 2 |

*The total surface area as referenced in Table II refers to a total surface area calculated from both sides of the catalyst regions such as the catalyst regions 104 without the wires 502.
**The number "2" referenced in this column indicates both sides of the catalyst regions such as the catalyst regions 104 described herein are included in the calculation of the total surface area of Table II.

As can be seen from Table II, the total surface area generally increases with the size of mesh opening.

Example 7

Further Surface Area Determinations and Enhancements

In one variation of this example, wires having diameters of 150 nm and length of 1.3 μm are grown on arrays formed from various mesh sizes shown in Table II, with enhancement in surface area shown in Table III. In another variation of this example, wires having diameters of 13 nm and length of 1.0 μm are grown on arrays formed from various mesh sizes shown in Table II, with enhancement in surface area shown in Table IV.

TABLE III

| Array Size | Total Area cm$^2$/cm$^2$ | Pt Loading* mg/cm$^2$ |
| --- | --- | --- |
| 1500 | 12.7 × 2 | 0.04 × 2 |
| 1000 | 14.7 × 2 | 0.05 × 2 |
| 750 | 16.0 × 2 | 0.05 × 2 |
| 500 | 17.4 × 2 | 0.06 × 2 |
| 300 | 17.5 × 2 | 0.06 × 2 |

TABLE IV

| Array Size | Total Area cm$^2$/cm$^2$ | Pt Loading* mg/cm$^2$ |
| --- | --- | --- |
| 1500 | 18.2 × 2 | 0.06 × 2 |
| 1000 | 21.0 × 2 | 0.07 × 2 |
| 750 | 22.9 × 2 | 0.08 × 2 |
| 500 | 24.9 × 2 | 0.08 × 2 |
| 300 | 25.0 × 2 | 0.08 × 2 |

*The Pt loading in Table III and Table IV is calculated based on four (4) atomic layers.

While the best mode for carrying out the invention has been described in detail, those familiar with the art to which this invention relates will recognize various alternative designs and embodiments for practicing the invention as defined by the following claims.

What is claimed:

1. A fuel cell electrode assembly comprising:
   a substrate; and
   a plurality of spaced apart catalyst regions each having a surface contacting the substrate and a thickness dimension extending from the surface, the surface including a linear dimension, greater than the thickness dimension, that is the largest linear distance between two points on an outer boundary of the surface, the catalyst regions including catalyst metals and being provided with less than 5% weight of carbon materials.

2. The fuel cell electrode assembly of claim 1, wherein the plurality of spaced apart catalyst regions include a number of atomic layers of the catalyst metals, the number of atomic layers including a first atomic layer, a second atomic layer, and a number of intermediate atomic layers positioned between the first and second atomic layers, a total number of the atomic layers being less than 200.

3. The fuel cell electrode assembly of claim 2, wherein the total number of the atomic layers is from 3 to 20.

4. The fuel cell electrode assembly of claim 2, wherein the number of the atomic layers extend in a direction substantially parallel to the thickness dimension of the plurality of the catalyst regions.

5. The fuel cell electrode assembly of claim 1, wherein an average aspect ratio between the linear dimension and the thickness dimension is greater than 100.

6. The fuel cell electrode assembly of claim 1, wherein the catalyst metals are selected from the group consisting of platinum nickel alloys Pt$_3$Ni, platinum cobalt alloys PtCo, platinum copper alloys Pt$_3$Cu, and combinations thereof.

7. The fuel cell electrode assembly of claim 1, wherein at least a portion of the plurality of spaced apart catalyst regions have a first and a second precious metal-containing shell layers and a base metal-containing core layer disposed between the shell layers, wherein the first precious metal-containing shell layer includes the surface contacting the substrate.

8. The fuel cell electrode assembly of claim 7, wherein the base metal-containing core layer supports a plurality of wires.

9. The fuel cell electrode assembly of claim 8, wherein at least a portion of the wires include a base metal-containing core and an outer layer of precious metals.

10. The fuel cell electrode assembly of claim 7, further comprising an intermediate coating material disposed between the core layer and at least one of the shell layers, the intermediate coating material being in at least one of electronic communication and lattice communication with the at least one of the shell layers.

11. The fuel cell electrode assembly of claim 1, wherein the substrate includes an ion-conducting membrane.

12. The fuel cell electrode assembly of claim 1, wherein the plurality of spaced apart catalyst regions include one or more base metals.

13. The full cell electrode assembly of claim 1, wherein the plurality of catalyst regions are provided with less than 1% weight of carbon materials.

14. A fuel cell electrode assembly comprising:
   an ion conducting membrane; and
   a plurality of spaced apart catalyst regions each having a surface contacting the ion conducting membrane and a thickness dimension extending from the surface, the surface including a linear dimension greater than the thickness dimension, wherein the plurality of catalyst regions include a number of atomic layers of catalyst metals and being provided with less than 5% weight of carbon materials, the number of atomic layers including a first atomic layer, a second atomic layer, and a number of intermediate atomic layers positioned between the first and second atomic layers, a total number of the atomic layers being 2 to 20.

15. The full cell electrode assembly of claim 14, wherein the plurality of catalyst regions are provided with less than 1% weight of carbon materials.

* * * * *